3,116,267
OXYMETHYLENE POLYMERS CONTAINING AMIDE STABILIZERS
Thomas J. Dolce, Summit, N.J., assignor to Celanese Corporation of America, New York, N.Y., a corporation of Delaware
No Drawing. Filed Aug. 17, 1959, Ser. No. 833,940
13 Claims. (Cl. 260—45.9)

This invention relates to polymers which are structurally related to polyoxymethylene and particularly to polymers of high thermal stability. This invention also relates to a method for improving the thermal stability of polymers.

Polyoxymethylene polymers, having recurring

—CH$_2$O— units have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordination complexes with organic compounds, as described in U.S. Patent No. 2,989,506 by Hudgin and Berardinelli.

Although polyoxymethylenes prepared by some methods are more stable against thermal degradation than those prepared by other methods, it is nevertheless desirable for many uses that the thermal stability be increased.

In accordance with one aspect of the present invention the heat stability of oxymethylene polymers is enhanced by the incorporation into the polymer structure of oxyalkylene groups having adjacent carbon atoms and the blending therewith of a compound having from one to six amide groups and preferably from one to two amide groups.

The amide compounds which may be used include primary, secondary and tertiary amides and include aliphatic, aromatic, cycloaliphatic and heterocyclic amides. The compounds may be either saturated or unsaturated. Among the specific compounds which may be used are malonamide, propionamide, subacamide, N-phenyl acrylamide, N,N'-methylene-bis-acrylamide, benzamide, N-methylolacrylamide, N,N,N',N'-tetracyclohexylmalonamide, N,N-diethylmethacrylamide, N,N'-di-n-hexylmalonamide, succinamide, N-methyl acetanilide and mellitic hexamide.

In accordance with this aspect of the invention, the aforesaid amide compound is incorporated into a copolymer containing oxymethylene groups, oxyalkylene groups having adjacent carbon atoms, and particularly copolymers containing from 60 to 99.6 mol percent of recurring oxymethylene groups. It appears that the susceptibility of oxymethylene polymers to thermal stabilization by the addition of the aforementioned amide compounds is enhanced by incorporating into the polymer oxyalkylene units having adjacent carbon atoms and derived from cyclic ethers having adjacent carbon atoms.

Among the copolymers which are utilized in accordance with this aspect of the invention are those having a structure comprising recurring units having the formula

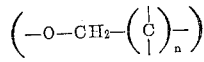

wherein $n$ is an integer from zero to 5 and wherein $n$ is zero in from 60 to 99.6 percent of the recurring units.

A preferred class of copolymers are those having a structure comprising recurring units having the formula (—O—CH$_2$—(CH$_2$)$_n$) wherein $n$ is an integer from zero to 2 and wherein $n$ is zero in from 60 to 99.6 percent of the recurring units. These copolymers are prepared by copolymerizing trioxane with a cyclic ether having the structure

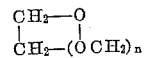

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

In preparing the copolymers, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiomeric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in copending application S. No. 718,147, filed February 28, 1958 by Donald E. Hudgin and Frank M. Berardinelli.

In accordance with another aspect of the invention the oxymethylene polymer contains an amide compound, as described above, and an alkylene bisphenol as thermal stabilizers. It appears that the stabilization action of the amide compounds and of the bisphenols enhance each other so that a mixture of a stabilizer of each class is more effective than a comparable amount of stabilizer of either class, by itself.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(5-methyl-6-tertiary butyl phenol) and 4,4'-butylidene bis-(6-tertiary butyl-3-methyl phenol).

The amide compound is generally admixed with the oxymethylene polymer in amounts not exceeding 2%, based on the weight of the oxymethylene polymer, and preferably in amounts between about 0.10 and 1.0 weight percent. The alkylene bisphenol, when used, is admixed in amounts not exceeding 2 weight percent and preferably from about 0.1 to about 1 weight percent.

The amide compounds, and the alkylene bisphenols, if desired, may be admixed intimately with the oxymethylene polymer by being applied in solution in a suitable solvent to the finely divided solid oxymethylene polymer followed by evaporation of the solvent. Methanol, diethyl ether, cyclohexane, acetone are typical suitable solvents.

The admixture may also be made by dry blending the finely divided oxymethylene polymer and finely divided stabilizers, by milling the stabilizers into the polymer as the latter is worked on a rubber mill or by dissolving the oxymethylene polymers and the stabilizers in a common solvent, such as dimethyl formamide.

The compositions of this invention may also include, if desired, plasticizers, fillers, pigments and other stabilizers, such as benzophenone derivatives which are stabilizers against degradation by ultraviolet light.

*Example I*

Into a 5 liter 3-neck flask fitted with a mechanical stirrer, a condenser and a thermometer were placed 2100 g. of molten and filtered trioxane, 900 g. of cyclohexane and 52.5 g. of dioxolane (2.5% based on trioxane). The mixture was heated to 60° C. and when solution was complete, 0.63 ml. of $BF_3$.dibutyletherate in 20 ml. cyclohexane was added (0.021% of total mass). The solution became slightly cloudy and was stirred for 4 min. at 60° C. It was then poured into a Readco mixer (sigma blade type) where the temperature was controlled around 60° C. Reaction was allowed to proceed for 90 min. in the mixer after which the contents were poured into 3 liters of acetone containing 5 ml. of tributylamine. After washing with this solution, the polymer was filtered and washed twice again with acetone. After filtering the polymer was dried at 65–70° C. for several hours. The yield of the polymer was 63.2% and the dioxolane content was 3.9% (assuming all the dioxolane entered the polymer).

Three grams of the above copolymer was slurried with a solution of 0.03 g. of propionamide and 0.03 g. of 2,2'-methylene-bis-(4-methyl-6-tertiary butyl phenol) in about 15 ml. of methanol. The solution was stirred occasionally until the methanol had evaporated leaving the stabilizers dispersed on the polymer. The polymer was then thoroughly dried at 65–75° C. for two hours and tough disc was compression molded at 190° C. for 4 minutes at a pressure of 1500 p.s.i.

The degradation rate was determined in an open vessel in a circulating air oven. The degradation rate was 0.64 wt. percent/min. for the first 6% of the polymer and 0.17 wt. percent/min. for the remainder. The unstabilized polymer had a degradation rate of 2.3 wt. percent/min.

*Example II*

The procedure of Example I was repeated except that sebacimide was substituted for propionamide on an equal weight basis. The degradation rate was 0.35 wt. percent/min. for the first 3% of the polymer and 0.13 wt. percent/min. for the remainder.

*Example III*

The procedure of Example I was repeated except that N-phenylacrylamide was substituted for propionamide on an equal weight basis. The degradation rate was 0.69 wt. percent/min. for the first 6% of the polymer and 0.17 wt. percent/min. for the remainder.

*Example IV*

The procedure of Example I was repeated except that malonamide was substituted for propionamide on an equal weight basis. The degradation rate (at 222° C. in air) was 0.26 wt. percent/min. for the first 5% and 0.08%/min. for the remainder.

*Example V*

To 40 g. of a copolymer substantially similar to that described in Example I except that it contained 5.1% dioxolane (actual analyzed content) was added 0.04 g. malonamide and 0.20 g. of 2,2'-methylene-bis-(4-methyl-6-tertiary butyl phenol). The powders were dry blended and fed to small milling rolls where the polymer was milled at 200° C. for 30 min. After removal the polymer had a degradation rate (at 222° C. in air) of 0.03%/min. The degradation rate of the original polymer was 3.0%/min.

*Example VI*

The procedure of Example I was repeated except that benzamide was substituted for propionamide on an equal weight basis. The degradation rate at 222° C. was 0.41 wt. percent/min.

*Example VII*

The procedure of Example I was repeated except that N,N,N',N'-tetracyclohexylmalonamide was substituted for propionamide on an equal weight basis. The degradation rate at 222° C. was 0.23 wt. percent/min. for the remainder.

*Example VIII*

The procedure of Example V was repeated except that the alkylene bis phenol was omitted and the amount of malonamide was raised to the 1% level. The resulting degradation rate was 0.33 wt. percent/min. for the first 5.5% of the polymer and 0.51 wt. percent for the remainder. Thus, the single stabilizer, although present at a higher weight concentration than the combined weight of the stabilizers of Example V was not as effective.

It is to be understood that the foregoing detailed description is given merely by way of illustration and that many variations may be made therein without departing from the spirit of my invention.

Having described my invention what I desire to secure by Letters Patent is:

1. A polymer composition comprising a moldable oxymethylene polymer and a stabilizing amount of a compound which is an amide of a carboxylic acid having at least three carbon atoms and having from one to six amide groups and consisting of carbon, hydrogen, nitrogen and oxygen atoms, said oxymethylene polymer containing oxyalkylene groups having more than one carbon atom and containing from 60 to 99.6 mol percent of oxymethylene groups.

2. A polymer composition comprising a moldable oxymethylene polymer and a stabilizing amount of a compound which is an amide of a carboxylic acid having at least three carbon atoms and having from one to two amide groups and consisting of carbon, hydrogen, nitrogen and oxygen atoms, said oxymethylene polymer containing oxyethylene groups and containing from 60 to 99.6 mol percent of oxymethylene groups.

3. A polymer composition comprising a moldable oxymethylene polymer and a stabilizing amount of a compound which is an amide of a carboxylic acid having at least three carbon atoms and having from one to two amide groups and consisting of carbon, hydrogen, nitrogen and oxygen atoms and a stabilizing amount of an alkylene bisphenol having from 1 to 4 carbon atoms in the alkylene group and having from 0 to 2 alkyl substituents on each benzene ring, each alkyl substituent having from 1 to 4 carbon atoms.

4. A polymer composition comprising a moldable oxymethylene polymer and a stabilizing amount of a compound which is an amide of a carboxylic acid having at least three carbon atoms and having from one to two amide groups and consisting of carbon, hydrogen, nitrogen and oxygen atoms and a stabilizing amount of an alkylene bisphenol having from 1 to 4 carbon atoms in the alkylene group and having from 0 to 2 alkyl substituents on each benzene ring, each alkyl substituent having from 1 to 4 carbon atoms, said oxymethylene polymer containing oxyethylene groups and containing from 60 to 99.6 mol percent of oxymethylene groups.

5. The polymer composition of claim 2 wherein said compound is propionamide.

6. The polymer composition of claim 2 wherein said compound is sebacamide.

7. The polymer composition of claim 2 wherein said compound is malonamide.

8. The polymer composition of claim 2 wherein said compound is benzamide.

9. The polymer composition of claim 2 wherein said compound is N,N',N',N'-tetracyclohexylmalonamide.

10. The polymer composition of claim 2 wherein said compound is N-phenylacrylamide.

11. The polymer composition of claim 4 wherein said alkylene bisphenol is 2,2'-methylene-bis (4-methyl-6-tertiary butyl phenol).

12. The polymer composition of claim 4 wherein said alkylene bisphenol is 4,4' butylidene-bis (6-tertiary butyl-3-methyl phenol).

13. The polymer composition of claim 4 wherein said alkylene bisphenol is present in amounts between about 0.1% and 2% and said amide compound is present in amounts between about 0.1% and 2%, based on the weight of oxymethylene polymer.

References Cited in the file of this patent

UNITED STATES PATENTS

| | | |
|---|---|---|
| 2,296,249 | Austin | Sept. 22, 1942 |
| 2,376,354 | Gresham | May 22, 1945 |
| 2,395,265 | Gresham | Feb. 18, 1946 |
| 2,475,610 | Gresham et al. | July 12, 1949 |
| 2,871,220 | MacDonald | Jan. 27, 1959 |
| 2,897,178 | Hill | July 28, 1959 |
| 2,966,476 | Kralovec et al. | Dec. 27, 1960 |
| 3,001,966 | Funck et al. | Sept. 22, 1961 |

FOREIGN PATENTS

| | | |
|---|---|---|
| 1,179,858 | France | Dec. 22, 1958 |